United States Patent [19]

Clark et al.

[11] Patent Number: 4,893,127

[45] Date of Patent: Jan. 9, 1990

[54] RADAR NAVIGATION SYSTEM

[75] Inventors: Stanley L. Clark, Derry; Carsten H. Peters; Jack R. Trommer, both of Bedford, all of N.H.

[73] Assignee: Raytheon Company, Lexington, Mass.

[21] Appl. No.: 333,890

[22] Filed: Apr. 3, 1989

Related U.S. Application Data

[63] Continuation of Ser. No. 12,095, Feb. 6, 1987, abandoned.

[51] Int. Cl.$^4$ .............................................. G01S 1/08
[52] U.S. Cl. .................................. 342/386; 342/407; 342/388; 340/995; 364/448
[58] Field of Search ............... 342/386, 387, 388, 389, 342/407; 340/995; 364/444, 448, 449, 452, 456

[56] References Cited

U.S. PATENT DOCUMENTS

| | | |
|---|---|---|
| 2,691,161 | 10/1954 | Allen . |
| 2,856,743 | 2/1952 | Thresher et al. . |
| 3,890,616 | 6/1975 | Kojima et al. . |
| 3,896,432 | 7/1975 | Young . |
| 3,904,817 | 9/1975 | Hoffman et al. ................. 342/185 |
| 3,916,410 | 10/1975 | Elwood . |
| 3,952,299 | 4/1976 | Hodge et al. . |
| 4,004,460 | 1/1977 | Whipps . |
| 4,253,149 | 2/1981 | Cunningham et al. . |
| 4,386,355 | 5/1983 | Drew et al. . |
| 4,413,322 | 11/1983 | Foster et al. . |
| 4,428,057 | 1/1984 | Setliff et al. . |
| 4,434,422 | 2/1984 | Kenol et al. . |
| 4,490,722 | 12/1984 | Rounion et al. . |
| 4,513,378 | 4/1985 | Antkowiak . |
| 4,547,778 | 10/1985 | Hinkle et al. ................. 342/456 |
| 4,590,569 | 5/1986 | Rogoff et al. . |
| 4,692,869 | 9/1987 | King et al. ................. 342/401 |

*Primary Examiner*—Thomas H. Tarcza
*Assistant Examiner*—David Cain
*Attorney, Agent, or Firm*—William R. Clark; Richard M. Sharkansky; Philip J. McFarland

[57] ABSTRACT

A low cost electronic navigation system including a Loran receiver and a marine radar unit adapted to receive vessel position information from the Loran. A computer within the radar unit uses successive Loran outputs to display vessel heading and the bearing of objects of interest such as other vessels or waypoints in graphic and numeric form. The navigator may accurately determine the bearing of such objects of interest in magnetic or true form. Other modes are of particular use when the navigator is interested in using the system to maintain a desired course, to avoid obstacles, or to determine if and by how much he must change his present course to return to the desired course.

4 Claims, 7 Drawing Sheets

RADAR NAVIGATION SYSTEM

This application is a continuation of application Ser. No. 012,095 filed Feb. 6, 1987 now abandoned.

BACKGROUND OF THE INVENTION

This invention relates generally to radar navigation systems, and more particularly, to a radar system adapted to accept position information inputs and display current course and waypoint information on a radar display.

The sextant, nautical chart and compass have long been the most important tools of a navigator. With information derived from the sextant, present position may be fixed in latitude and longitude. A desired course may be determined by plotting the present position on the nautical chart together with the position of a desired destination. The compass may then be used to steer along the determined course. Modern navigators have additional electronic devices to aid them. For example, the differences in the time of arrival between a master radio frequency signal and at least two secondary radio frequency signals are used by a Loran to determine the vessel's present position. Some Loran units may also be programmed with the position of the desired destination and thus can also provide an automatic numeric display of the determined course as a magnetic or true bearing. When the destination is far away, it is useful to program the Loran to provide successive courses to intermediate places along the way called waypoints. Marine radars make use of the property that radio frequency signals are reflected by surrounding objects to provide an electronic picture of nearby land masses, vessels and other hazards.

Electronic devices such as Loran and radar have thus been found to be quite helpful. However, when the vessel is underway the navigator's task includes not only considering the determined course but also how to navigate to the destination. Navigation involves not only considering course information from multiple sources such as the Loran's latitude and longitude outputs, the chart, and fixed navigational aids such as buoys, but also visual and radar derived information concerning fixed hazards such as rocks and moving hazards such as other vessels. Thus, successful navigation involves considering information from a variety of sources.

Some Lorans are also adapted to provide a course deviation indicator output, typically a bar graph type display. The navigator can use this display to determine when he has deviated from the determined course. When temporarily avoiding obstructions such as rocks or other vessels, this is of some aid in returning to the determined course. But such indicators can also tend to become yet another source of information to be constantly considered.

One approach to solving the problem of considering navigation information from a variety of sources has been to use an integrated electronic chart display such as that disclosed in U.S. Pat. No. 4,590,569 to Rogoff et al. Such a system provides a single display integrating information available from the radar, Loran, and charts, thus obviating the need to observe multiple information sources. Such an electronic chart device includes a computer having a memory for storing an electronic representation of a chart of the area in which the vessel is presently located. This system also accepts the video output from a radar, and by using the Loran present position output and a highly accurate calibration device, overlays the radar video output on the chart display. True or magnetic bearings to objects of interest may be determined. Present position data from the Loran and other useful information is displayed in numerical form. Such systems tend to be quite a bit more expensive than standard marine radar systems because of the need for accurate calibration, and because chart data must be developed and stored in electronic form. Such systems are quite useful to pilots of large commercial vessels who can justify the added expense. However, a much more common problem is that of operator of a small vessel, such as a fisherman or recreational yachtsman, who find the cost of such electronic map systems to be prohibitive.

SUMMARY OF THE INVENTION

Accordingly, it is an object of this invention to provide a low cost, simple radar display apparatus for providing present position and waypoint information in graphical form.

Another object of this invention is to provide, without the use of an electronic compass or gyroscope, vessel heading information in magnetic or true bearing form on the radar display apparatus.

A further object of this invention is to provide a simple way to find a magnetic or true bearing to hazards shown on the radar display apparatus.

Yet another object is to provide a simple indication on the radar display apparatus if a vessel deviates from its desired course to a waypoint.

Briefly, the foregoing and other objects are accomplished by a radar display apparatus modified to periodically accept present course information inputs in electronic form from a navigation device such as a Loran. A computer associated with the radar display apparatus then uses the present course information to label the radar display with an indication of the vessel's course. An electronic bearing line and variable range marker can be used to find the distance and bearing of objects appearing on the radar display, such bearings being displayed in magnetic or true format. As the Loran also provides information relating to the position of waypoints in electronic form, such information, when converted to X-Y scan form, may be used to plot an indication of a selected waypoint on the radar display apparatus. A line drawn from the present position to the waypoint can be compared with a heading line on the radar display to indicate the present position of the vessel relative to the desired position along the course line to the waypoint.

BRIEF DESCRIPTION OF THE DRAWINGS

The foregoing and other objects, advantages and novel features of this invention become apparent from the following detailed description when considered with the accompanying drawings, wherein.

DETAILED DESCRIPTION OF THE PREFERRED EMBODIMENTS

Figure 1:
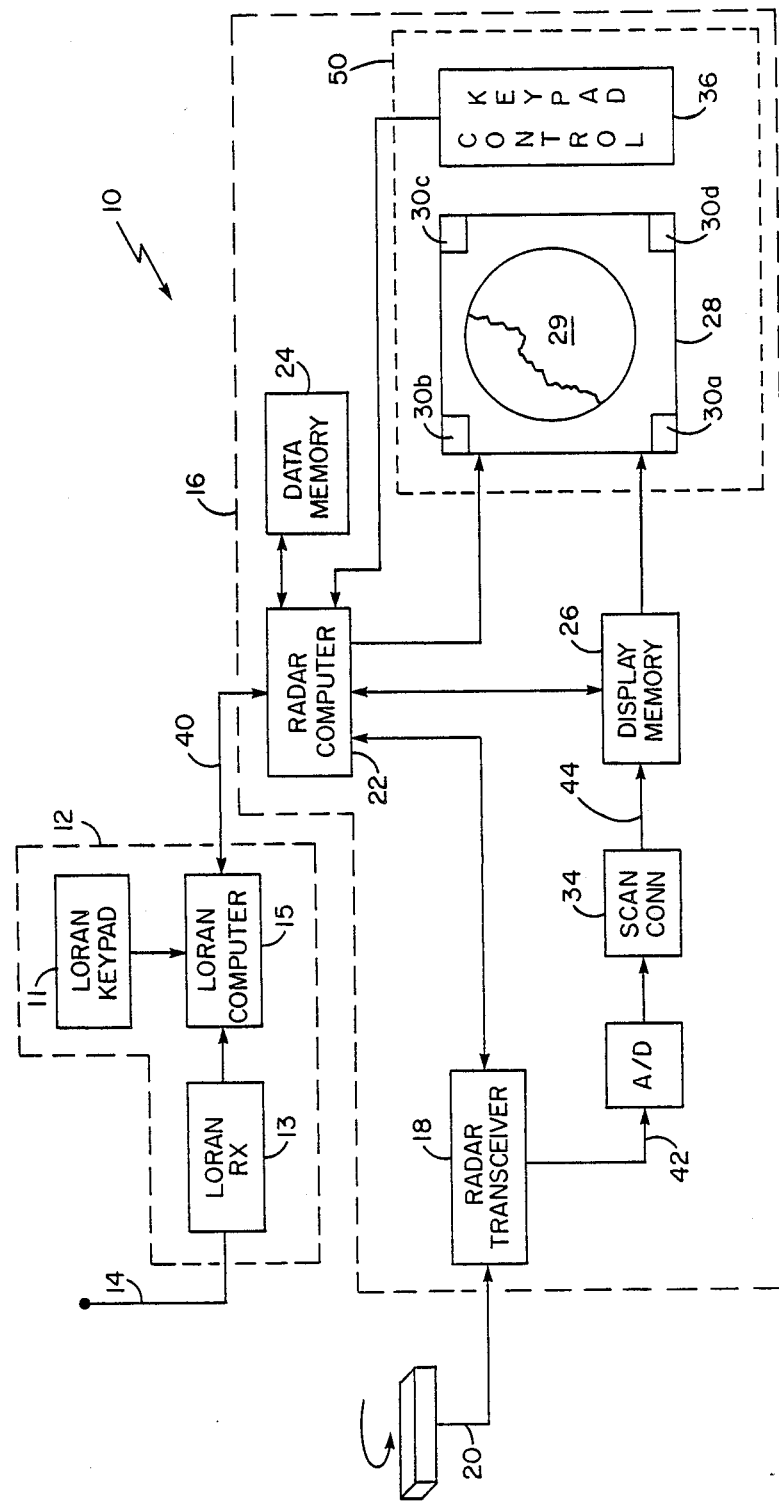
FIG. 1 is a block diagram of a radar navigation system according to this invention, the system including a display and a computer.

Referring now to the drawings, in which like reference characters designate corresponding parts throughout the several figures, there is shown in FIG. 1 a block diagram of a radar navigation system 10 comprising vessel position determining means, here a Loran 12 including Loran receiver 13, Loran computer 15, and a Loran keypad 11, for converting signals from a Loran antenna 14 for presentation, over a Loran interface bus 40, to a radar unit 16. Radar unit 16 includes a radar transceiver 18 adapted for transmitting, receiving, and demodulating radar signals via a radar antenna 20, an analog to digital converter 32, a scan converter 34, and a display 28 for displaying radar images received by transceiver 18, and radar computer 22, display memory 26, data memory 24 and control keypad 36 for coordinating the operations of radar unit 16. Thus, this invention combines a display 28 for displaying radar images, a Loran 12 or similar navigation device for determining vessel position, an interface bus 40 and radar computer 22 for determining the vessel's present heading, desired course, and bearing information, and a display memory 26 for storing the course bearing, and heading information for use by the display 28.

More particularly, Loran receiver 12 is preferably one designed in accordance with the well-known Loran-C standard for providing accurate position information in electronic form. The position information on Loran interface bus 40 is in digital form, preferably in accordance with an industry standard such as National Marine Electronics Association (NMEA) Standard 0183. Such position information includes present vessel position in time difference or latitude/longitude format. Other information such as vessel average speed over ground, vessel magnetic or true heading, range and bearing to the next waypoint, location of the next waypoint in time difference or latitude/longitude format, and angle of difference between the vessel's present course and the proper course to the next waypoint may also be generated by Loran computer 15 and transmitted over Loran interface bus 40. The format of information present on Loran interface bus 40 is selectable by the navigator via Loran keypad 11. As stated, present position information typically can be selected via Loran keypad 11 to be in either a time difference or a latitude/longitude format. Heading and bearing information can also be selected to be provided in either magnetic format (that is 0-360° referenced to magnetic north) or true format (that is 0-360° referenced to actual north). Loran 12 outputs information along Loran interface bus 40 indicating the selected formats. Loran 12 provides all such information in real time or may use Loran computer 15 to integrate position information over time and output such integrated data less often.

Radar unit 16 is preferably embodied as one physical unit so that it may be marketed as a radar and purchased separately from the Loran 12. Radar unit 16 is also preferably of the low cost commercial marine-type radar typically having a maximum range of 8 to 32 nautical miles. Radar antenna 20 is a directional rotating type antenna. As previously stated, radar unit 16 includes a radar transceiver 18 for transmitting and receiving radio frequency radar signals via radar antenna 20 and providing a radar image in radar scan format on an output line 42. Radar computer 22 controls the operation of radar transceiver 18, setting its current range, fine tuning operating frequency, testing, calibrating and other such typical radar functions. Data memory 24 is connected to computer 22 and provides storage for these and other operations of radar computer 22. Display memory 26 is also connected to computer 22 and provides a means by which radar computer 22 may control the information shown on display 28. The radar image output from radar transceiver 18 along line 42 is fed to analog-to-digital converter 32. A scan converter 34 converts the radar image from analog-to-digital converter 32 into X-Y scan format for storage into display memory 26.

Display 28 includes areas such as radar output area 29 for displaying the scan converted radar image, and also areas such as 30a–d for displaying information provided via computer 22 from Loran 12 or other information pertinent to the operation of radar 18. Information areas 30a–d are controlled by computer 22 via display memory 26. If a portion of display memory 26 is dedicated to receiving radar image data in X-Y format, it is preferred that data memory 26 contain one memory location for each pixel in radar output area 29. It is also preferable in this instance that a single display memory 26 be provided and both the data from radar computer 22 and scan converted radar image data on line 44 be provided to it rather than have two separate display memorys.

Display 28 and control keypad 36, collectively referred to as radar front panel 50, are positioned so as to be readily receivable and accessible by the navigator. Control keypad 36 provides a way for the navigator to use computer 22 to select system parameters such as radar range, display modes (to be discussed in more detail shortly) and other functions.

Figure 2:
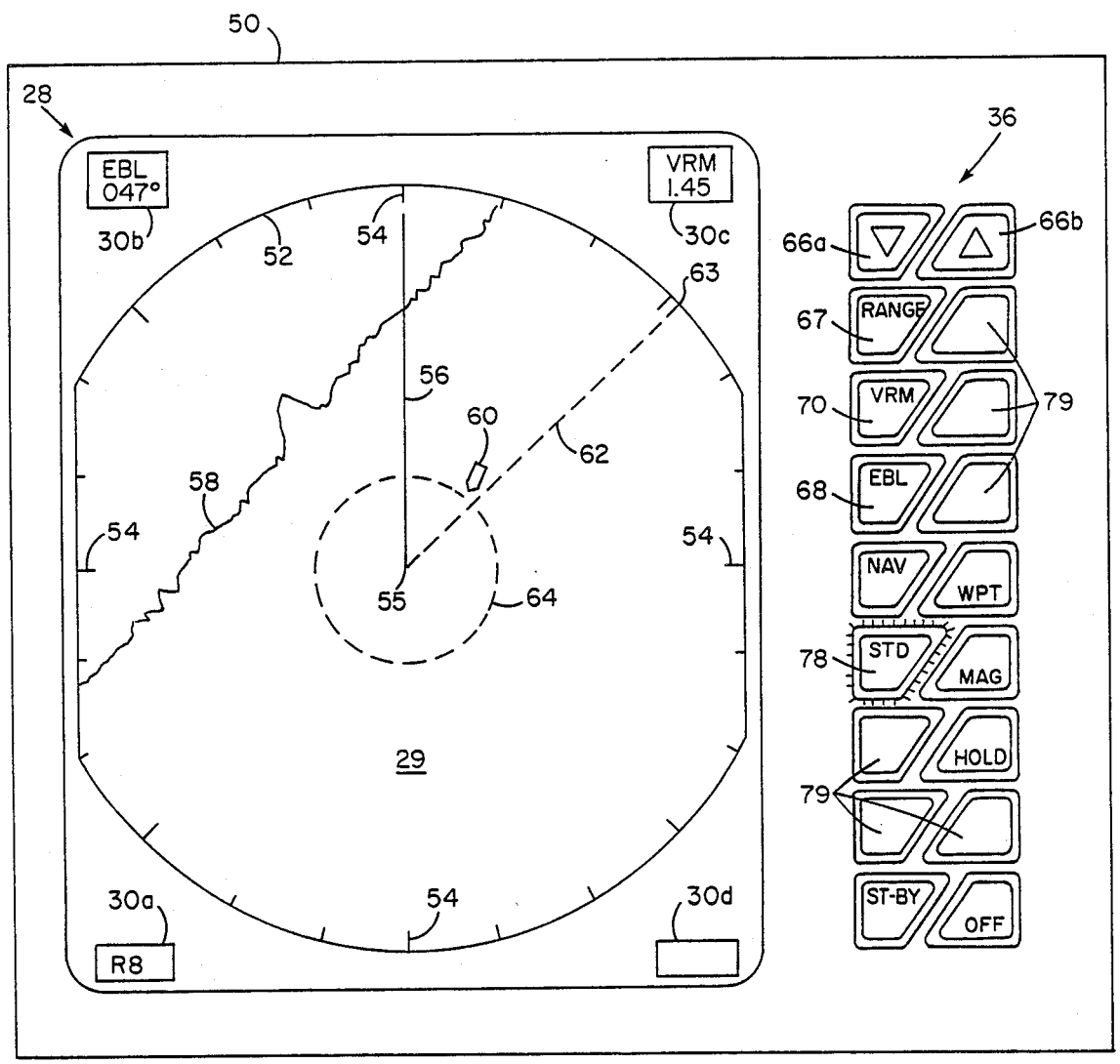
FIG. 2 is a typical scene on the display when a standard mode is selected.

FIG. 2 is a more detailed view of radar front panel 50 including the display 28 and control keypad 36 areas. Shown is the information preferably presented when radar unit 16 is operating in a standard (i.e., STD) mode, that is without making use of the data available from Loran receiver 12. The navigator may select STD mode by depressing an appropriate key 78 labeled "STD" of control keypad 36. As shown, it may be desirable for mode keys such as STD key 78 to have a light emitting diode or other light source contained therein to provide positive feedback to the operator that a particular mode has been selected. Now, more particularly, the information available on display 28 in STD mode includes the aforementioned radar image area 29 presenting a display of navigation obstructions in the immediate area of the vessel such as land mass 58 and another vessel 60. Cathode ray tubes such as display 28 are typically rectangular rather than square. As radar images are typically round, radar image area 29 may be shown enlarged but with cropped sides to enhance the portion of the radar image of greatest interest. A heading line 56 is drawn from a present position point 55 in the center of radar image area 29 in a direction forward from the present position 55 to the periphery of radar image area 29 in a straight up or 0° direction as shown. Heading line 56 thus indicates the path of the vessel if it continues on its present course. A compass rose 52 is drawn around the periphery of radar image area 29, to assist in indicating the relative bearing of various objects appearing in radar image area 29. Objects dead ahead of the vessel thus appear at a relative bearing of 0°, and those directly off the starboard beam appear at 90°, for example. Compass rose 52 may include indicia such as tic marks 54 adjacent the major relative compass points such as 0°, 90°, 180° and 270°, and may also be augmented with numerals or additional tic marks other points on compass rose 52 as well. Information such as the present range setting of radar unit 16 is displayed in an information area such as 30a. Here the range of radar image area 29 being indicated as eight nautical miles. The operator may control the range displayed via keypad 36 and in particular, for example, by enabling the range change key 67 and using decrease key 66a or increase key 66b to increase or decrease the present range.

Other features of STD mode include an electronic bearing line (EBL) and variable range marker (VRM). The EBL feature is shown on radar image area 29 of display 28 as a dashed line or other graphic indicator 62 drawn from the present position 55 out to a point 63 on compass rose 52. This is done by radar computer 22 (FIG. 1) sending appropriate data into display memory 26 and/or instructions to display 28. EBL graphic indicator 62 may be enabled or disabled via EBL key 68a and when enabled may be rotated clockwise by depressing increase key 66b or counterclockwise by depressing decrease key 66a. In this manner, EBL graphic indicator 62 may be used to align the present position 55 with objects in the viewing range of the radar such as another vessel 60. The relative bearing of such objects of interest may be thus obtained by enabling the EBL feature and rotating it to the desired position via keys 68, 66a and 66b and reading the relative bearing at the point where EBL graphic indicator 62 intersects compass rose 52. Additionally, it is normally desired that a numeric indication of EBL position be displayed to obviate the need of interpolating compass rose 52. As the EBL is under control of radar computer 22, it is an easy matter for radar computer 22 to also display such a numeric EBL indication in one of the information areas 30b.

The VRM feature is similarly used to determine the range of objects of interest. A VRM graphic indicator 64 appears, in radar image area 29 as a dashed circle. The VRM graphic indicator 64 is controlled by radar computer 22. It may be enabled by depressing VRM key 70 or its radius increased by pressing increase key 66b or decreased by pressing decrease key 66a. In this manner, the range of objects of interest appearing in the radar image area 29 may be determined by moving the VRM graphic indicator to a position of interest and reading a VRM numeric indicator displayed in information area 30c.

It should be understood that other features of radar system 16, although not a subject of this invention, are necessary and controlled by additional keys 79 present on keypad 36. Such auxiliary features include radar transmitter gain and tuning adjustment, clutter filters, video brilliance controls, and other typical features such as object alarms. The status and/or output of such auxiliary features may be displayed in information area 30d.

Figure 3:
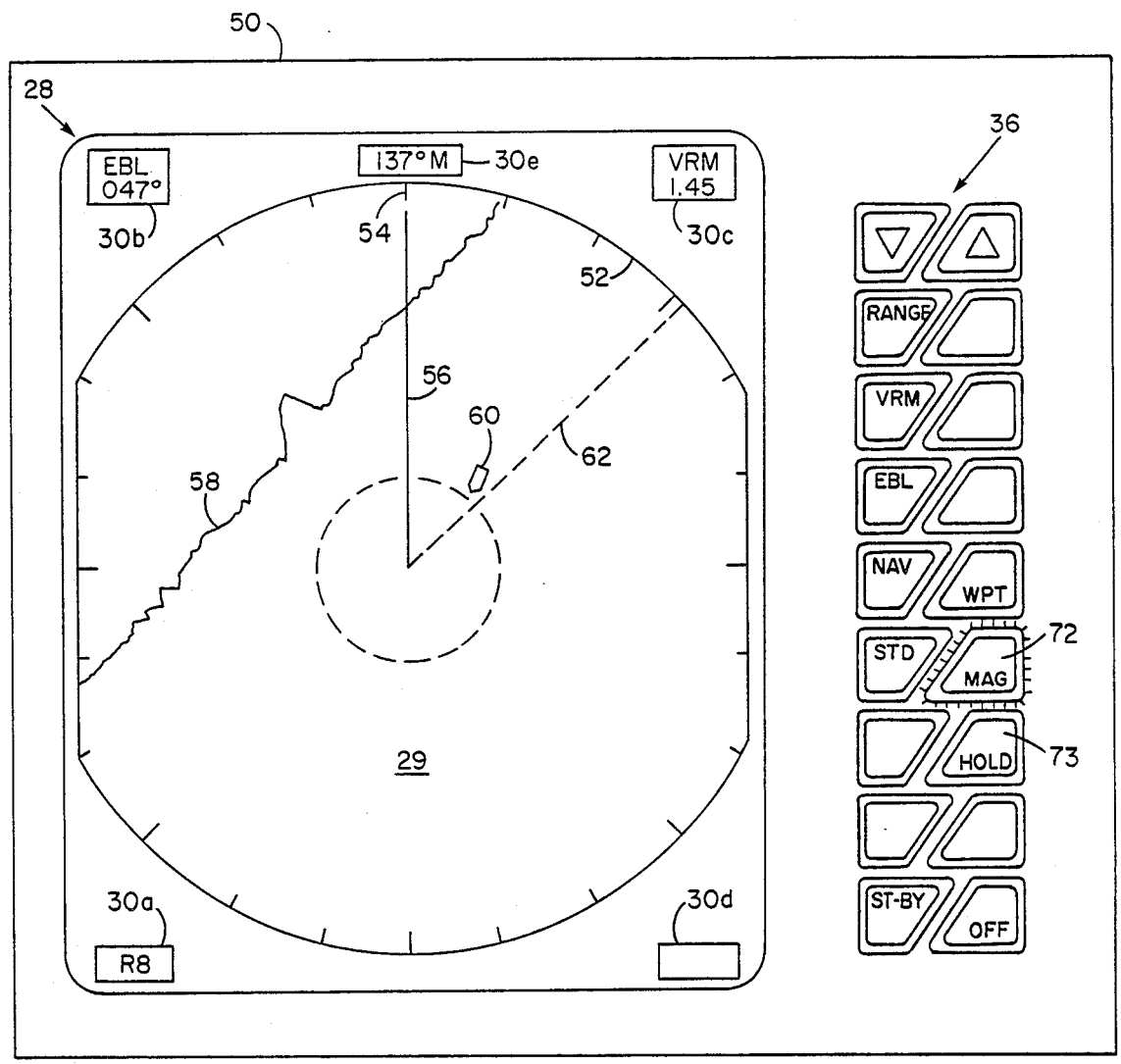
FIG. 3 shows the display when a magnetic/true mode is selected.

Turning attention to FIG. 3, there is shown a representation of radar front panel 50 when the magnitude/true (MAG) mode has been selected by the navigator depressing MAG key 72. In MAG mode, radar image area 29 appears essentially as in the previous STD mode showing heading line 56, obstructions such as land mass 58, the other vessel 60, the EBL indicators 62 and 30b, and VRM indicators 64 and 30c. However, radar computer 22, enabled to receive data from Loran 12 in continuous fashion, also provides an indication of the vessel's present course on display 28. The course calculation is completed in either magnetic or true mode as selected by the navigator when setting up the Loran 12 via Loran keypad 11 (FIG. 1). Present course information may be presented either as a number calculated by Loran computer 15 and fed to radar computer 22 over Loran bus 40 or may be calculated by radar computer 22 comparing successive present position information outputs available as Loran 12 operates over time. In either event, the result is that radar computer 22 causes a numeric indication of the present actual course to be displayed in a course information display area 30e. This course information display area 30e is preferably adjacent the tic mark 54 near heading line 56. An indication of whether this course is in magnetic or true mode, such as displaying the letter M or T next to the numeric course, is also provided. Thus, heading line 56 aligns with the numerical indication of the present course in much the same manner as a conventional compass. In this mode the navigator can use the EBL feature to obtain a magnetic or true bearing to objects of interest such as the other vessel 60. In particular, numeric EBL indicator 30b is now displayed as an actual bearing in magnetic or true form (as per the present setting of Loran 12). This actual bearing may, as shown, replace the STD mode relative numeric EBL indicator, or be shown in addition to it.

Because the heading shown on the display varies as the vessel yaws and pitches in inclement weather or otherwise maintains an unsteady course it is sometimes desirable for the radar image area 29 and the present course indicator 30e to be temporarily frozen. This enables the navigator to use the EBL and VRM features to determine the actual true or magnetic bearing and distance to objects of interest from a stable reference present course. Thus, it is preferred that means be provided for freezing the present course as displayed in information area 30e and the radar image shown in image area 29. Such means may include computer 22 inhibiting the update of image area 29 and information area 30e when the navigator depresses a HOLD key 73.

It is important to note that the navigator's vessel must be moving in order to have meaningful present course information and hence a valid magnetic or true numeric EBL indicator. This is so because, as previously stated, the present course is derived from successive present position outputs from the Loran, and if the vessel is not moving, the difference between successive positions is zero. However, as this invention is meant to be of greatest use when the vessel is underway, and to provide navigation information in graphic and numeric form at minimum cost, any disadvantage of not having bearing information in magnetic or true format when the vessel is stationary is outweighed by the cost savings in eliminating gyroscopes or other accessory electronic compass instruments. Thus, another desirable feature is for computer 22 to detect when the difference between successive outputs from Loran 12 is nearly zero, and take appropriate action such as inhibiting the update of information areas using this information, and/or displaying an indication that this has occurred such as in auxiliary information area 30d.

Figure 4:
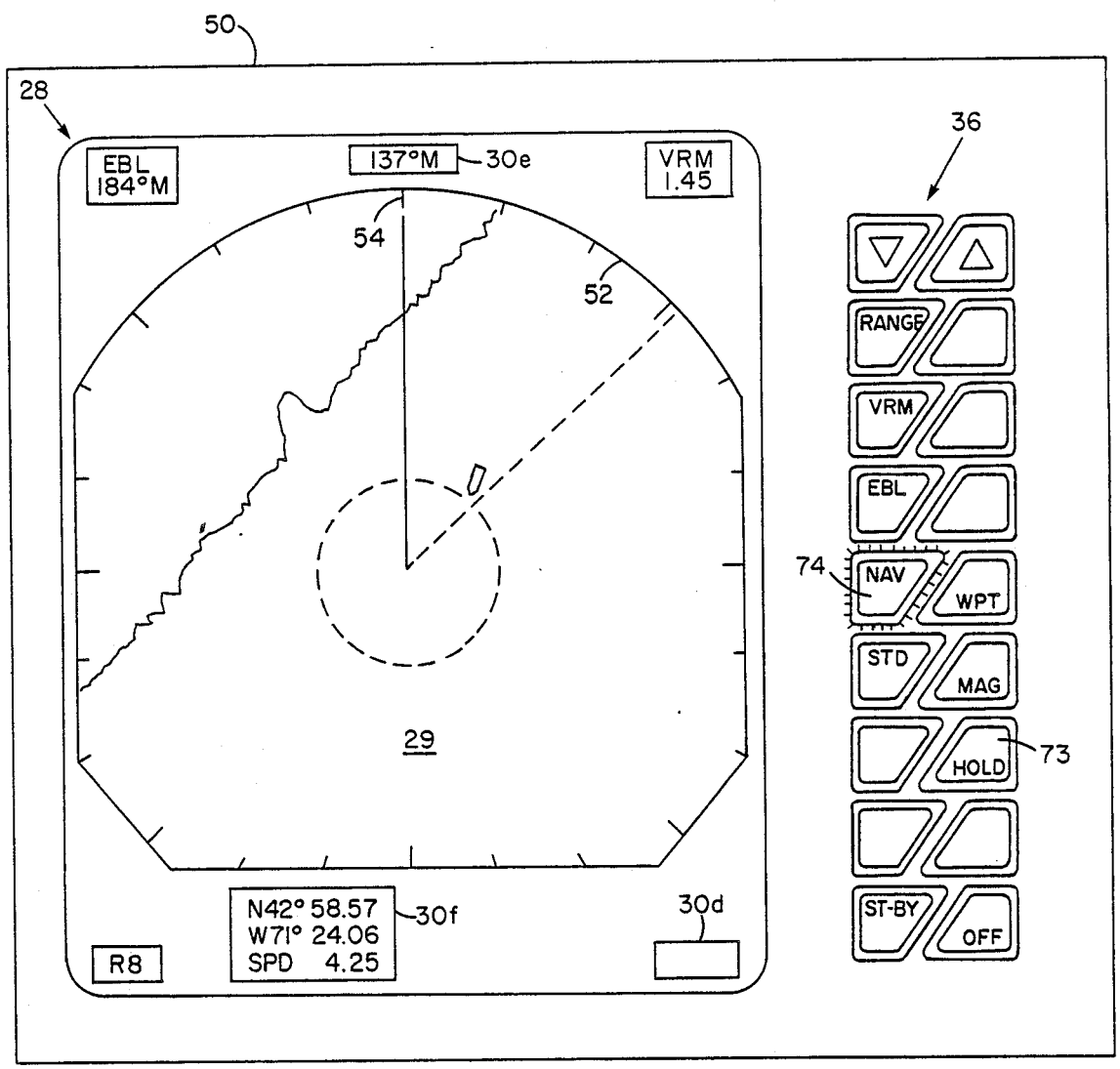
FIG. 4 shows the display when a navigate mode is selected.

FIG. 4 shows display 28 when the navigation (NAV) mode has been selected. The navigator enables NAV mode by selecting the NAV key 74. In this mode, display 28 shows all of the information previously described for MAG mode and additional information relating to vessel speed and present position. As shown in FIG. 4, information area 30f now contains the vessel's present position in latitude and longitude format. If the Loran 12 is set in time difference mode, present position information is shown in time difference format. Speed information displayed in area 30f is also derived from the data presented over bus 40 or from radar computer 22 calculations based on successive outputs from Loran 12. Speed is computed as the quotient of distance difference and elapsed time. As shown, radar image area 29 may be reduced in size by cropping its bottom portion. This provides additional space on display 28 for the speed and current position information area 30c.

As for MAG mode, present course information is provided in true or magnetic format (as selected on the Loran 12) in course information area 30e and the navigator may make full use of the EBL and VRM features to determine the distance and actual bearing to objects of interest.

The navigator may also freeze the present course area 30e and the radar image area 29 by depressing the HOLD key 73 when in NAV mode. The VRM and EBL features remain available so that the navigator may determine the distance and bearing of objects of interest on this frozen display.

Figure 5:
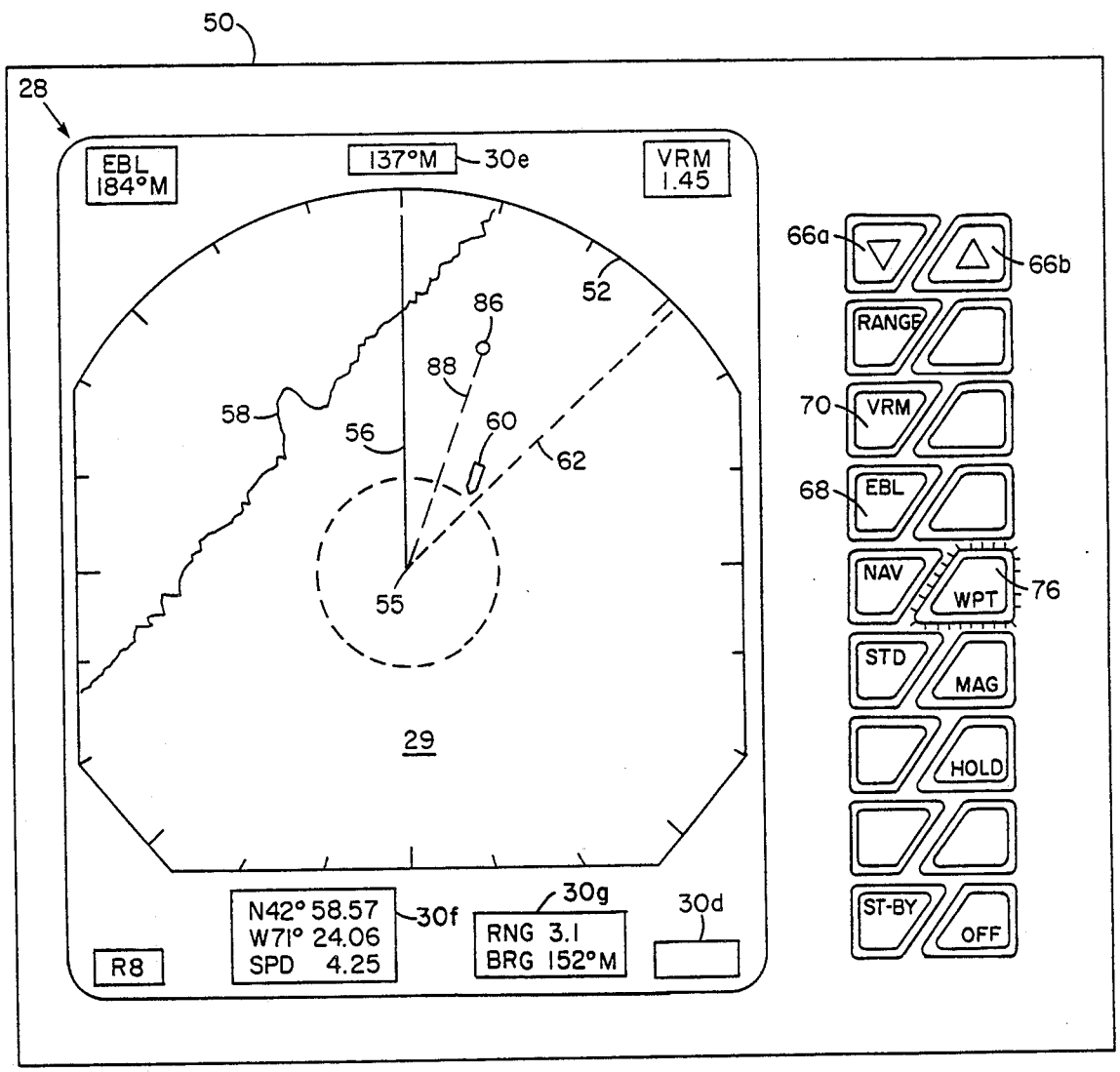
FIG. 5 shows the display when a waypoint mode is selected.

FIG. 5 is a representation of radar front panel 50 when a waypoint (WPT) mode is selected. WPT mode contains all of the features of NAV mode plus additional features. In particular, if Loran computer 14 has been programmed by the navigator via Loran keypad 11 with various waypoint positions, a waypoint graphic indicator 86 is drawn by radar computer 22 writing on the radar image area 29 of display 28. The waypoint graphic indicator may appear as a small circle drawn on the screen at the position of the selected waypoint, as shown, or other convenient indicating symbol. A waypoint bearing line 88 is drawn from the current position point 55 to the waypoint graphic indicator 86, thereby graphically illustrating the bearing of the waypoint relative to heading line 56, and its position with respect to the other vessel 60 and land mass 58. Additionally, a waypoint numeric display area 30g contains numeric information pertaining to the range and bearing of the selected waypoint in either magnetic or true format as selected on Loran 12. As before, the EBL and VRM keys 68 and 70 and keys 66a and 66b are available for use. Waypoint bearing line 88 is thus preferably drawn as a line with a format different from EBL graphic indicator 62 so that they may be distinguished. If display 28 is a color display, EBL graphic indicator 62 and waypoint bearing line 88 might, for example, be drawn in different colors. If the range of the waypoint is such that it would appear beyond the area currently displayed in radar image area 29, the waypoint bearing line 88 is drawn from the present position 55 to a position adjacent compass rose 52 to at least provide an indication of its direction.

Waypoint bearing line 88 thus provides a graphic indication of the bearing to the selected waypoint. This is another way of saying the position of waypoint bearing line 88, when compared to the position of heading line 56, provides a graphic indication of how much the vessel has deviated from its desired course. When heading line 56 and waypoint bearing line 88 lie adjacent each other, the navigator thus immediately knows that the vessel is on course. Visually comparing heading line 56 and waypoint bearing line 88 is also of use when the vessel has purposely deviated from its desired course, such as in the situation shown in FIG. 5, in order to avoid obstacles like the other vessel 60. In this situation, the navigator has deviated from the desired course in order to avoid the other vessel 60 temporarily, while at all times easily keeping track of the course he will need to steer in order to return to the desired course once the other vessel has passed. He may also simultaneously monitor other objects of interest such as land mass 58. These operations are done by looking only at display 28 and not by looking at multiple sources of information such as the Loran 12, a conventional radar screen and a navigational chart.

In a typical operation sequence then, the navigator programs waypoint position information into Loran computer 15 (FIG. 1) via Loran keypad 11 and selects the desired bearing and heading data format, either magnetic or true. He then selects whether the position information is provided in latitude/longitude or time difference format. The navigator also selects the desired auxiliary modes for display 28 and radar unit 16 via keypad 36. As Loran receiver 13 begins to operate a stream of data is output from the Loran 12 to the radar unit 16. This data is stored by radar computer 22 in data memory 24. Successive outputs from the Loran 12 are used by radar computer 22 to determine the present heading, speed, course, and waypoint position information as needed per the modes selected by the operator. The information is then displayed on display 28 in the manner described.

Figure 6A:
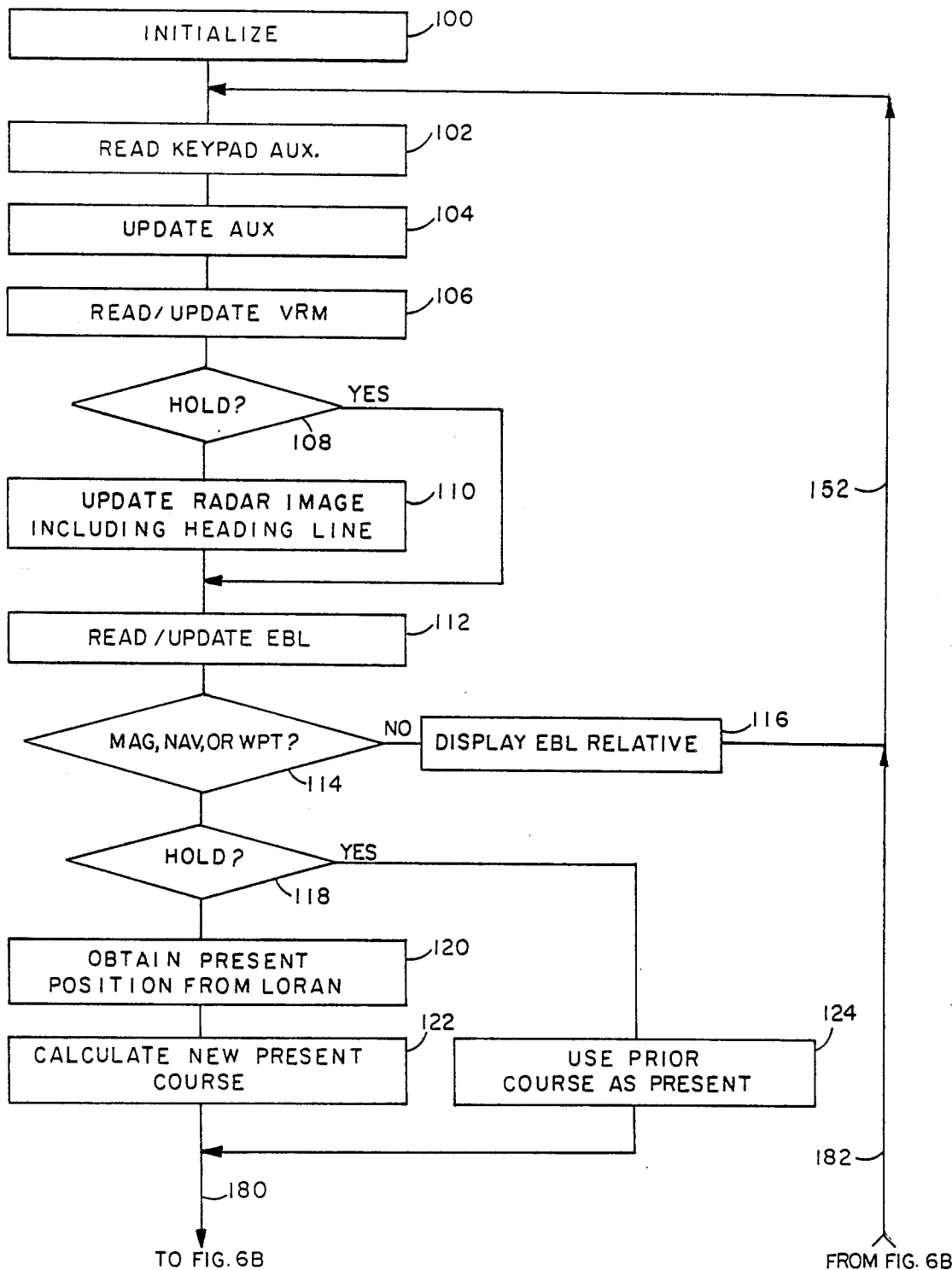
FIGS. 6A and 6B show a flow chart of a computer program which may be executed by the radar system computer to perform operations in accordance with the invention.
Figure 6B:
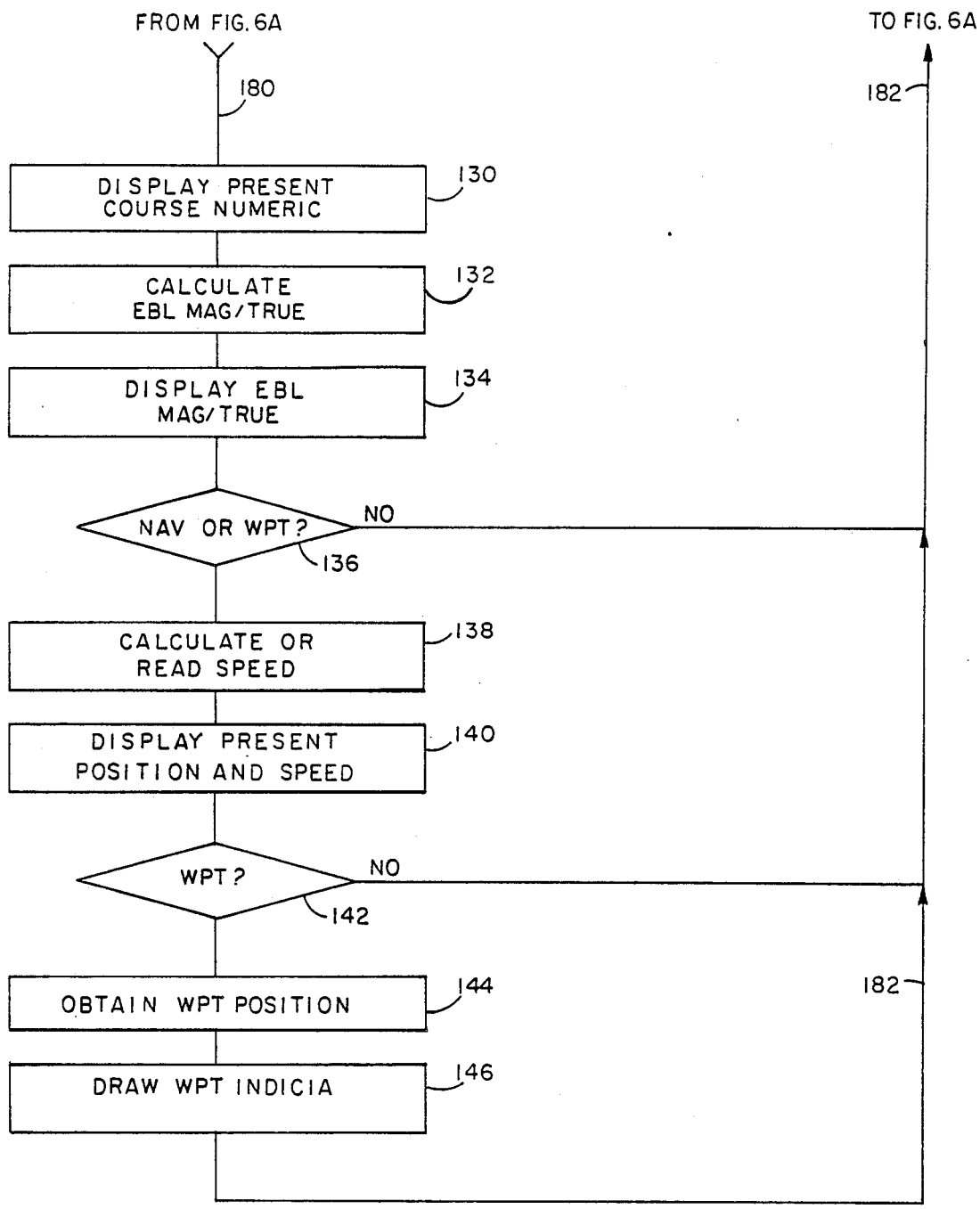

A flow chart of the operations performed by radar computer 22 in the preferred embodiment is shown in FIGS. 6A and 6B. It should be understood that this is only one implementation and other embodiments of software used by radar computer 22 are possible. It may be helpful to periodically consult FIG. 1–5 while reading the following description. More particularly now, as shown in FIG. 6A, radar computer 22 once powered on, first executes Step 100 Initialize. This procedure includes normal power on/reset features such as diagnostic testing, establishing communication with Loran 12 over Loran interface bus 40 and initializing radar receiver 18, display memory 26 and display 28 and other initialization functions as needed. Step 102 Read Keypad Aux is next performed. This is the first step in an operational loop that is continuously executed by radar computer 22. This step scans the auxiliary keys 79 and determines if their status has changed since the last pass through the loop. The next Step 104 Update Aux is then performed to update and/or perform any of the auxiliary operations detected as having been selected and/or disabled in Step 102. Step 106 Read/Update VRM samples the keys 70, 66a, and 66b to determine if the operator has enabled, disabled, or adjusted the position of the VRM graphic indicator 64. If so, radar computer 22 causes the appropriate VRM graphic indicator 62 to be erased and/or redrawn in radar image area 29. In the preferred embodiment, VRM graphic indicator 64 would be only redrawn if its position changes from what was previously displayed; that is, for example, if it is newly enabled or disabled or if the decrease or increase keys 66a or 66b have been depressed. The VRM numeric indicator 30c is also updated if necessary in this step. The next step to be executed is a decision, Step 108

Hold?. Here the hold key 73 is sampled to determine if it is active. If it is not active, control passes to Step 110. If it is active, control passes around Step 110 to Step 112. If Step 110 Update Radar Image Including Heading Line is to be executed, the radar image fed from display memory 26 to radar display 28 is fed to radar image area 29. This step may include drawing the proper heading line 56 if necessary. If Step 110 is not executed, the radar image area 29 is not updated. In this manner the hold key 73 may be used to selectively allow or not allow updating of radar image area 29. In any case, control next passes to Step 112 Read EBL. In this step it is determined if the status of the EBL key has changed from the previous pass through the loop. If so, the EBL features are either enabled or disabled. If the EBL feature is enabled, this step also scans keys 66a and 66b to determine if the navigator desires to change the position of the EBL. If so, the EBL graphic indicator 62 is updated in accordance with the result of scanning keys 66a and 66b. Before an updated EBL numeric indicator 30b can be drawn, however, the display mode must first be determined. Step 114 MAG, NAV, or WPT? determines the present mode. If the answer to this question is "no", indicating that STD mode has been selected, control passes to Step 116 Display EBL Relative causing the EBL numeric indicator 30b to be displayed as a relative bearing with respect to heading line 56. From Step 116, control passes via branch 182 back to Step 102 and the loop is re-executed. If the answer to the test in Step 114 was "yes", control instead passes to Step 118 Hold? where this step, in similar fashion to Step 108, determines if hold key 73 is presently being depressed. If the answer is "no", radar computer 22 next executes Step 120 Obtain Present Position From Loran and Step 122 Calculate New Present Course. These steps, as their names suggest, obtain present position information from the Loran 12 and calculate a new present course based upon the difference between this new present position and the present position read from a prior pass through the loop. Step 120 also provides information pertaining to the format of the present position i.e., is it in time difference or latitude/longitude as well as the present bearing selection being either magnetic or true as selected by the operator on Loran 12. If the answer to the question in Step 118 was "yes", control passes instead to Step 124 Use Prior Course As New which uses the course calculated on a prior pass through Steps 120 and 122 when the hold key 73 was not depressed. In this manner hold key 73 is used to inhibit the updating of the present course.

In either event, control next passes along branch 180 to the Step 130 Display Present Course Numeric shown in FIG. 6B. This step causes the present course as determined in either Steps 122 or 124 to be displayed in present course numeric area 30e. The course information is displayed in either magnetic or true form as programmed by the navigator on Loran 12 and fed to radar computer 22 in Step 120. Step 132 Calculate EBL Mag/True can now be performed to provide a magnetic or true EBL numeric indicator in information area 30b by comparing the relative position of the EBL with the present course. This numeric EBL indicator is then displayed in Step 134 Display EBL Mag/True. Control next passes to Step 136 which determines if the speed and/or present position should be displayed. If NAV or WPT mode are not selected, Step 136 NAV or WPT? thus transfers control back to the beginning of the loop via branch 182 and Step 102 of FIG. 6A. If these modes are selected, control passes to Step 138 Calculate Or Read Speed which either calculates the present vessel's speed based upon the new present position and the prior present position from a prior pass through the loop and the elapsed time between passes or may read this directly from Loran 12 over interface bus 40 if Loran 12 has such a feature. In either event, Step 140 Display Present Position And Speed causes the present position as previously determined in Step 120 and the present speed as determined in Step 138 to be displayed in information area 30f. Step 142 next determines if WPT mode has been selected. If not, control passes via branch 182 back to the beginning of the loop and Step 102. If it has been selected, the position of the next waypoint is obtained from Loran 12 in Step 144 Obtain WPT Position. After the waypoint position has been obtained, Step 146 Draw WPT Indicia Mag/True displays the waypoint graphic and numeric indicia in the selected format. Control then passes via branch 182 back to the beginning of the loop and Step 102.

Thus, what has been shown and described is an improved navigation system which is particularly useful when a low cost graphic indication of most of the information important to a navigator is desired. While the foregoing is considered to be the preferred embodiment of this invention, several modifications will become readily apparent to those of skill in the art. For example, various other arrangements may be used to display numeric information on radar display 28. Additionally, it may be desirable to provide multiple waypoint graphic indicators 86 if Loran 12 is capable of providing such data, so that a series of waypoints might be viewed simultaneously by the navigator. Satellite navigation (SATNAV) devices or global positioning systems (GPS) may be used instead of Loran 12 to obtain position, course, or waypoint information. Thus, it is intended that this invention cover all forms of implementation including modifications, alterations, and changes falling within the true spirit and scope of the invention as described in the following claims.

What is claimed is:

1. A method for displaying information used by a navigator in navigating a vessel, comprising the steps of:

obtaining from a Loran unit electronic representations of the vessel's present position, the present course of the vessel, and the position of a waypoint;

generating a radar image including navigation obstructions in the area surrounding the vessel, the radar image also including a point corresponding to the vessel's present position and a point substantially dead ahead of the vessel;

providing a display of the radar image together with a numeric representation of the present course, the numeric representation of the present course being displayed adjacent the point on the radar image dead ahead of the vessel;

overlaying a heading line on the display, the heading line having as endpoints the point corresponding to the vessel's present position and the point substantially dead ahead of the vessel;

overlaying a graphic indication of the waypoint's position on the display; and overlaying a waypoint bearing line on the display, the waypoint bearing line having as endpoints the point corresponding to the vessel's present position and a point adjacent the graphic indication of the waypoint's position wherein the navigator is provided with the heading line, the bearing line to the waypoint, and navigation obstructions all on the display so that when the navigator deviates from the waypoint bearing to steer around navigation obstructions, there is a clear visual indication of that deviation by comparing the heading line with the waypoint bearing line.

2. An electronic apparatus for use by a navigator in navigating a vessel comprising:

means comprising a Loran receiver and computer for providing electronic representations of the present position of the vessel and the position of a waypoint selected by the navigator;

radar means for providing a radar image including navigation obstructions, the radar image having a certain range, the certain range including a point corresponding to the vessel's present position, and a point dead ahead of the vessel;

means for providing a heading line image, the heading line image including a line having as endpoints a point corresponding to the vessel's present position and a point corresponding to the point dead ahead of the vessel;

means, fed by said waypoint position, for providing a waypoint graphic image including an indicator positioned at a point corresponding to the position of the waypoint selected by the navigator;

means, controlled by the navigator, for providing an electronic bearing line image, the electronic bearing line image having endpoints at a point corresponding to the vessel's present position and the point corresponding to the position of the waypoint selected by the navigator; and display means for simultaneously displaying the radar image, the heading line image, the electronic bearing line image and the waypoint graphic image so that the navigator has a visual image on one display that includes the navigation obstructions, the heading line and the waypoint bearing line thereby enabling the navigator to compare the heading line with the waypoint bearing line while deviating course to steer around navigation obstructions.

3. A method for use by a navigator in navigating a vessel, comprising the steps of:

generating a radar image of the area surrounding the vessel including navigation obstructions, the radar image including a point corresponding to a present position of the vessel;

obtaining from a Loran unit an electronic representation of the position of the waypoint;

generating in response to the waypoint position electronic representation of a graphic waypoint image corresponding to the position of the waypoint;

overlaying the graphic waypoint image and the radar image;

overlaying a heading line on the radar image, the heading line having as endpoints the present position of the vessel and a point dead ahead of the vessel;

overlaying a waypoint bearing line on the radar image, the waypoint bearing line having as endpoints the point corresponding to the present position of the vessel and a point adjacent the graphic waypoint image; and providing a visual display of said radar image including the navigation obstructions, the heading line and the waypoint bearing line wherein the heading line deviation from the waypoint bearing line can be viewed on the same display that includes navigation obstructions.

4. An electronic apparatus for use by a navigator in navigating a vessel comprising:

means comprising a Loran receiver and computer for providing an electronic representation of the waypoint relative to the present position of the vessel in response to an operator actuated input corresponding to the location of a waypoint;

radar means for providing a radar image having a certain range including a point corresponding to the vessel's present position and a point dead ahead of the vessel, said radar image including navigation obstructions;

means for providing a heading line image including a line having as endpoints a point corresponding to the vessel's present position and a point corresponding to the point dead ahead of the vessel;

means responsive to the waypoint electronic representation for providing a waypoint graphic image including an indicator positioned at a point corresponding to the position of the waypoint designated by the operator actuated input;

means for providing an electronic bearing line image having endpoints corresponding to the vessel's present point and the point corresponding to the position of the waypoint designated by the operator actuated input; and display means for simultaneously displaying the radar image including the navigation obstructions, the heading line image, the waypoint graphic image, and the waypoint electronic bearing line wherein the angle between the heading line and the waypoint bearing line provides on the display a graphic indication of how much and in what direction the vessel's present course deviates from the course to the waypoint while at the same time having a visual presentation of the navigation obstructions on the same display.

* * * * *